Figure 1:
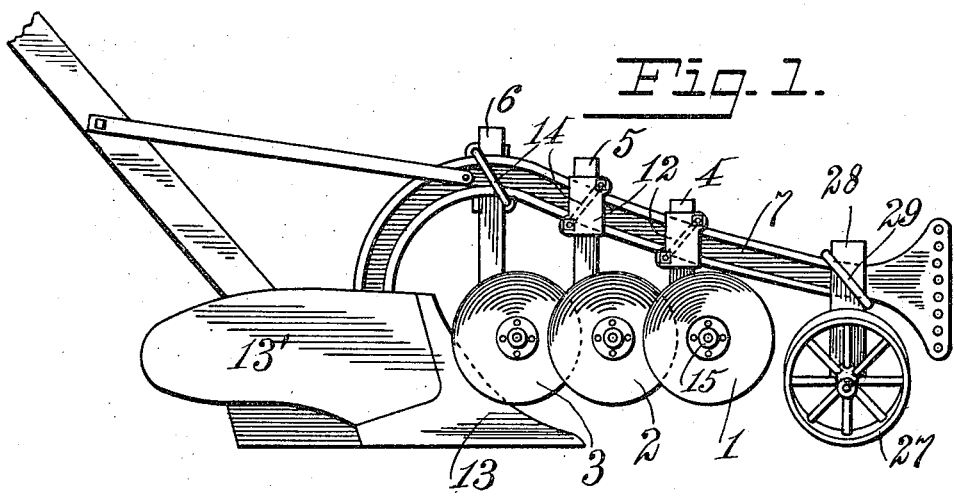

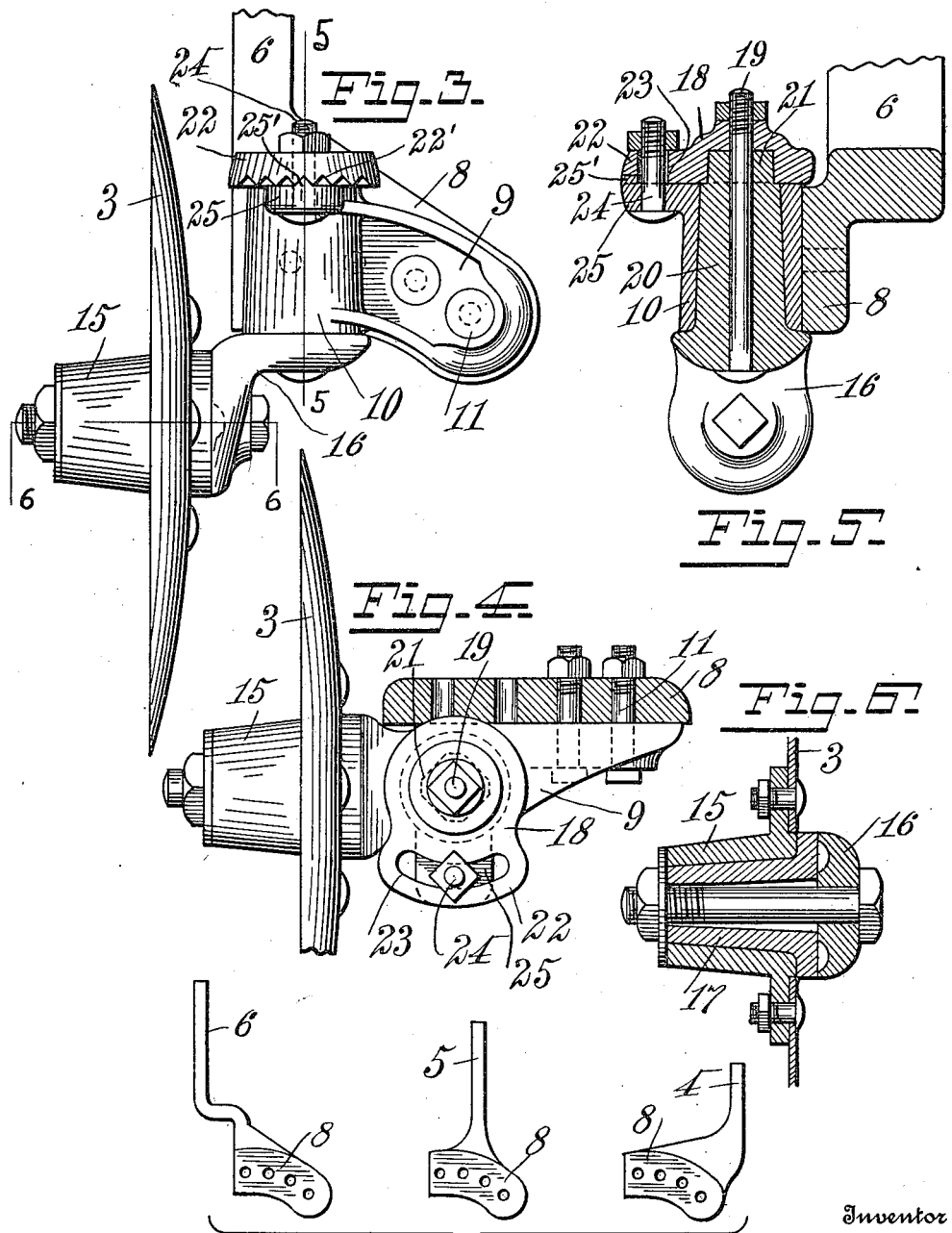

UNITED STATES PATENT OFFICE.

STEPHEN H. GARST, OF MOLINE, ILLINOIS.

PLOW.

1,281,339.　　　　　Specification of Letters Patent.　　Patented Oct. 15, 1918.

Application filed December 4, 1916. Serial No. 134,790.

*To all whom it may concern:*

Be it known that I, STEPHEN H. GARST, a citizen of the United States, residing at Moline, in the county of Rock Island and State of Illinois, have invented certain new and useful Improvements in Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in plows in the use of which the surface of the soil is pulverized to a substantial depth before the plowshare and mold-board cuts the furrow slice and inverts it into the adjacent furrow. This operation of pulverizing the surface of the soil is accomplished by arranging in a particular way a series of disks or jointers, the latter being a familiar form of small plowshare, in advance of the plowshare proper. As the plow moves forward the disks cut into the surface of the soil and pulverize and throw the same in advance of the plowshare. The soil so cut or pulverized by the disks is turned over by the plowshare proper into the adjacent furrow in a pulverized body, the soil acted upon by the plowshare crumbling or breaking up readily owing to the previous action of the disks on the soil above. In the operation of the plow, each disk throws the soil into the path of the preceding disk, that is to say, the front or foremost disk cuts off the corner of the furrow slice and pushes it into the adjacent furrow, the second or next forward advancing disk moves the soil in front of it into the path cut by the said foremost disk, and the third or last advancing disk moves the soil in front of it into the path of the second or next preceding disk. The whole top surface of the furrow slice is cut or pulverized by the disks and deposited into the adjacent furrow and covered by the bottom of the furrow slice which is cut loose and inverted by the plowshare proper. The idea of pulverizing the top soil and turning or inverting it by the well known turning plow, is not new, but heretofore the process or method involved a great amount of labor and delay. As is well known to farmers, delays just at the planting season are undesirable, and the extra labor is expensive. First, because the ground must be gone over from one to three times with a disk harrow to put it in proper condition. After this it is inverted by the plow, and the surface must then be pulverized by some sort of surface pulverizer. Owing to the delay attending this method, it has been found objectionable, and a better method of preparing the soil for planting has long been desired. It is therefore the object and purpose of the present invention to provide a means for forming a seed bed whereby the furrow slice is properly and thoroughly pulverized from top to bottom by the disks and then by the plowshare proper, and at the expense of less work or labor than is required for the initial plowing as heretofore.

Figure 2:
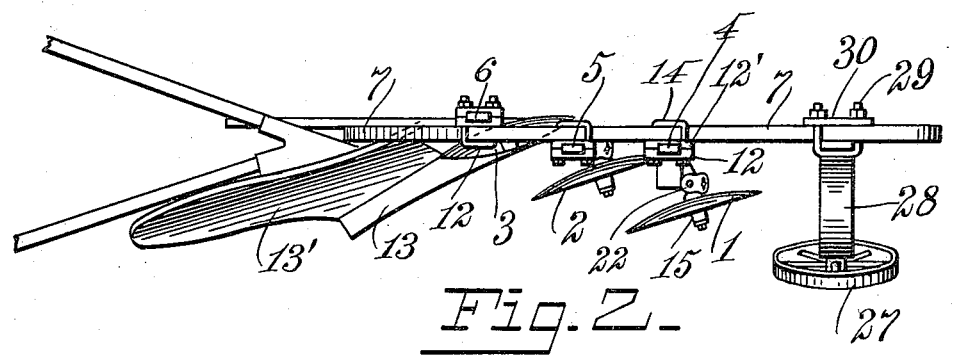
Figure 3:
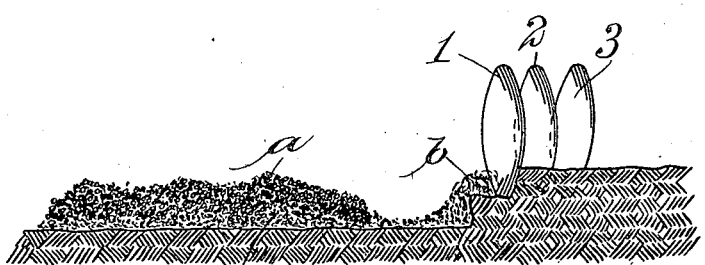

Preceding a detail description of my invention reference is made to the accompanying drawings of which Figure 1 is a side elevation of a walking plow having my improvements applied thereto. Fig. 2 is a top plan view of the same. Fig. 3 is an enlarged detail view of one of the pulverizing disks and the adjustable bearing or support therefor. Fig. 4 is a top plan view of Fig. 3 partly in section. Fig. 5 is a sectional view of the disk bearing or support on the line 5—5 of Fig. 3. Fig. 6 is a sectional view of the disk bearing on the line 6—6 of Fig. 3. Fig. 7 illustrates detached views of the angle bars by means of which the disk bearings are adjustably attached to the plow beam, and Fig. 8 is a diagrammatic view showing the successive action of the disks on the surface of the soil.

In a particular description of the invention similar reference characters will indicate corresponding parts as they are illustrated in the accompanying drawings.

The plow shown in Figs. 1 and 2 is a standard form of walking plow with curved steel beam 7 to which is attached the plowshare 13 and the mold-board 13'. My improvements are, however, applicable to other forms of plows, such for example as wheel plows. Adjustably mounted and supported on the beam 7 are, in the present instance, three pulverizing disks 1—2—3 or jointers, which as hereinbefore stated, are a small form of plow. These disks 1—2—3 are adjustably secured to standards 4—5—6 of graduated lengths, as shown in Fig. 7. The standards 4—5—6 are rigidly united at their lower extended ends 8 to laterally extended portions 9 of the upper hub portions 10 of the disk bearings or supports. The connections between the extensions 9, and the ends 8 of the standards, may be shifted by placing the bolts 11 which connect said parts in the inner or outer openings as shown in Fig. 4. The standards 4—5—6 are adjustable up and down on the beam 7 to regulate the depths of the disks, independently of the depth at which the plow is running, and also said standards are adjustable back and forth on the beam 7 in properly spacing the disks. These adjustments of the said standards are accomplished through means of their connections with the beam 7, which connections consist in each case of two clamping plates 12 and 12' which are held to the beam 7 by angle bolts 14, said bolts straddling the beam 7 and secured by nuts. The pulverizing disks 1—2—3 are provided each on the front or concave side with a hub 15 which hub is journaled on an axle 17. The axle 17 is joined to an upright axle or pivot 20 by an angle portion 16. The pivot 20 forms a vertical pivot for the disk. The parts 17—16 and 20 form the bearing proper for each disk. The part 20 has its upper end made square as at 21. A cap 18 fits over this square end and is provided with an extended portion 22 having a curved slot 23 therein through which a bolt 24 passes. Said cap also has notches 22' which receive a tooth 25' on projection 25 to lock the parts in position. The bolt 24 also passes through an opening in an extended portion 25 of the hub 10 which hub surrounds the vertical axle or pivot 20. The cap 18 is secured in position by means of a bolt 19. By this means the positions of the disks 1—2—3 may be adjusted to the proper angle and thereafter may be secured in said adjusted position. In each case the cap 18 and the vertical axle or pivot 20 are held together by a bolt 19 which penetrates the said axle and cap and is made secure by means of a nut as shown in Fig. 5. The upright axle 20 turns in the hub 10 of the bearing 16 so that when the bolts 19 and 24 are loosened, each disk can be turned at a greater or less angle to the beam 7 which adjustment is necessary in soils of different texture. The heavy soils require less of an angle or turn of the disk, while sandy soils require more of an angle. By the arrangement of the disks 1—2—3 as shown in Figs. 1 and 2 each disk clears the other; that is to say, the soil cut or pulverized by the foremost disk 1 is thrown into the furrow previously made by the plowshare proper as shown in Fig. 8, and leaves a clean and unobstructed path for the soil cut or pulverized by the next adjacent disk 2 to fall or be moved into, and this also is true of the rearmost disk 3 which has an unobstructed path in its operation of pulverizing the soil. There are no obstructions in front of any of the disks as each disk shoves the soil pulverized thereby into the next adjacent furrow. More particularly describing the action of the disks, it may be stated that in the operation of the plow the outside disk turns the furrow slice out of the way of the next adjacent disk, and the latter disk turns the furrow slice out of the way of the next rearward disk. In Fig. 8 of the drawings, the foremost disk 1 is acting upon the soil and is slicing off and moving into the adjacent furrow its portion of the soil. The next adjacent disk 2 acts in a similar manner, and moves the surface of the soil into the furrow made by disk 1, and in turn the last or rearmost disk 3 removes its portion of the surface of the soil into the furrow cut by disk 2. The plowshare and mold-board in turn, cuts and turns the slice over in an inverted manner, with the soil cut and pulverized by the disks 1—2—3 beneath the slice cut and inverted by said plowshare and mold-board.

In Fig. 8 —a— designates the slice inverted by the plowshare 13 and mold-board 13', and similarly —b— designates the pulverized soil which was previously cut by the disks 1—2—3. The furrow slice so turned over by the plowshare and mold-board is comparatively thin, by reason of the removal of a substantial portion of the surface above which was previously acted upon by the gang of disks, and as a result the furrow slice cut by said plowshare and mold-board crumbles and breaks up into a substantially pulverized condition as it is acted upon in the operation of being turned or inverted, and the soil is thus rendered ready for seeding.

It may be stated that the present invention accomplishes an improvement of the mechanical condition of the soil when plowed, so that it will be pulverized to the full depth of the furrow slice, and can be put in friable condition with much less labor than with the usual pulverizing implements. This is accomplished by stripping off the furrow slice to a substantial depth by the disks 1—2—3, or with jointers which perform the same function as the disks. The use of jointers instead of the disks 1—2—3 would necessitate a change in the manner of connecting said jointers to the plow beam.

It will be readily understood that in the operation of the plow comparatively little resistance will be offered to the plowshare and mold-board, and as a consequence the draft will be light. The resistance is lessened owing to the fact that the disks reduce the stiffness of the soil by cutting a substantial portion thereof from above the furrow slice, and because of this action of the disks, the furrow slice readily breaks up in the act of being inverted. In other words after the top of the furrow slice has been cut out and pulverized by the action of the disks, comparatively little resistance is offered to the plowshare and mold-board.

The plow as shown in Figs. 1 and 2 is adapted for turning a furrow slice 16″ wide by 6 or 8″ deep. Disk 1 is set so that it will cut the soil to a width of approximately 6″, and disks 2 and 3 are set to cut the balance or 5″ each. If the plow is turning a furrow slice 8″ thick, the disks will run about half that depth, and the plow will turn the balance. The left-hand side of the furrow is commonly called the land side and consists of a perpendicular wall which is in this case about 8″ high from the bottom of the furrow. In this case the disk 1 will cut a strip 6″ wide and 3 or 4″ deep off the land side or perpendicular wall of the furrow; that is to say, disk 1 will cut the corner of the land side of the furrow slice because said disk is set at an angle to the land side of said furrow slice. The corner as it is cut off is broken into small pieces by the action of the disk, and is pushed into the adjoining furrow. As this corner is free on two sides, it requires comparatively little power behind the disk to cut it loose and push it into the furrow. The center or next adjacent disk 2 runs far enough behind disk 1 so that said disk 1 does not obstruct disk 2, hence the latter disk also cuts off the corner and has the same advantage as disk 1 with reference to a light draft. Disk 2 may have a little more turn than disk 1 for the reason that it has farther to move the soil cut and pulverized thereby. Disk 3 is set far enough behind disk 2 to have the same advantage in cutting off the corner. The forward or cutting edge of disk 3 cuts a little wider than the width of the plow. The disks are not only set at an angle to the land side of the furrow, but are also slightly slanted at the top. Owing to the fact that disk 3 cuts a little wider than the plowshare and slants backward at the top as before stated, the land side of the furrow will be cut with more slope. This makes a clean furrow and enables the disks to work through trash, cornstalks, stubble, etc., which may cover the surface of the ground. The forward edges of the disks being on such angle and slanting, they will be caused to work their way under the trash, etc., by pushing it to one side and this will avoid cutting through all of the obstruction of this kind found in cultivating soils.

In order that the plow may run easily, and the work be facilitated, I place a ground wheel or runner 27 at the front end of the beam 7 which is perpendicular and reaches out from the beam. This wheel may be arranged to run upon the land or in the corner of the furrow as best suited to the kind of plow used. In addition to its being a support for the plow, it serves as a guide in the operation of the plow. It is mounted on an arm 28 which extends against the side of the beam and may be rigidly or adjustably secured thereto by any suitable means. In the drawing I show an angle bolt 29 the ends of which pass through and clamp the plate 30 and embrace the opposite side of the beam.

Having described my invention I claim:

1. The combination of the beam of a plow, a series of pulverizing disks each being connected to the plow beam by an individual adjustable connection, said disks being arranged in an oblique plane to travel in different parallel planes so that the foremost disk will cut off the corner of a furrow slice, and the soil cut by each disk will be moved thereby into the rear path of the next adjacent preceding disk, and a plowshare supported on said beam and adapted to cut a relatively thin furrow slice below the soil cut by the disks and to invert the same, substantially as described.

2. In a plow, the combination of a plowshare, a beam to which said plowshare is attached, a series of pulverizing disks arranged obliquely to the plane of the beam and traveling in different planes in front of the plowshare, said disks being adapted to cut the surface of the soil and to remove the soil cut, into the rear path of the next preceding disk, and a support for each disk affording vertical and lateral adjustments thereof, substantially as described.

3. In a plow, the combination of a plowshare, a beam to which said plowshare is attached, a series of soil-pulverizing disks arranged in an oblique plane to said beam, and individual adjustable supports for said disks by means of which the disks are supported on said beam and may be adjusted to vary the space between them and their depth, and their longitudinal distance one from the other.

4. In a plow, the combination with a beam, of a series of soil pulverizers, means for connecting said soil pulverizers to the beam so that they may have vertical, horizontal and angular ranges of adjustment, the pulverizers of said series being arranged in different planes one in advance of the other so that the foremost pulverizer will cut the corner off the furrow slice, and the soil cut by each succeeding pulverizer will be moved thereby into the rear path of the adjacent preceding pulverizer, and a plow-share attached to said beam and adapted to cut a furrow slice below the depth cut by the pulverizers and to turn said furrow slice over the top pulverized soil.

In testimony whereof I affix my signature, in presence of two witnesses.

STEPHEN H. GARST.

Witnesses:
SADIE GARST,
BARBARA E. GARST.